(12) United States Patent
Kim

(10) Patent No.: US 10,940,888 B2
(45) Date of Patent: Mar. 9, 2021

(54) CONTROL APPARATUS AND CONTROL METHOD FOR REAR WHEEL STEERING SYSTEM

(71) Applicant: MANDO CORPORATION, Gyeonggi-do (KR)

(72) Inventor: Sang Mook Kim, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 254 days.

(21) Appl. No.: 16/045,669

(22) Filed: Jul. 25, 2018

(65) Prior Publication Data

US 2019/0031238 A1 Jan. 31, 2019

(30) Foreign Application Priority Data

Jul. 27, 2017 (KR) .................. 10-2017-0095532

(51) Int. Cl.
| | | |
|---|---|---|
| B62D 13/02 | (2006.01) | |
| B60D 1/30 | (2006.01) | |
| B60D 1/62 | (2006.01) | |
| B62D 7/15 | (2006.01) | |
| B60W 10/20 | (2006.01) | |
| B62D 13/00 | (2006.01) | |
| B62D 13/04 | (2006.01) | |
| B62D 7/14 | (2006.01) | |

(52) U.S. Cl.
CPC ............ *B62D 13/025* (2013.01); *B60D 1/30* (2013.01); *B60D 1/62* (2013.01); *B60W 10/20* (2013.01); *B62D 7/159* (2013.01); *B62D 13/00* (2013.01); *B62D 13/04* (2013.01); *B62D 7/146* (2013.01); *B62D 7/148* (2013.01)

(58) Field of Classification Search
USPC .......................................................... 701/41
See application file for complete search history.

(56) References Cited

U.S. PATENT DOCUMENTS

| | | | |
|---|---|---|---|
| 2005/0206229 A1* | 9/2005 | Lu ............................ | B60T 7/20 303/123 |
| 2008/0036296 A1* | 2/2008 | Wu ........................ | B60W 50/06 303/146 |
| 2019/0031238 A1* | 1/2019 | Kim ........................ | B60D 1/62 |
| 2019/0100245 A1* | 4/2019 | Fukushima ........ | B62D 15/0275 |
| 2019/0161084 A1* | 5/2019 | Greenwood .......... | B60W 10/10 |
| 2019/0161118 A1* | 5/2019 | Greenwood ........... | B62D 13/06 |

\* cited by examiner

*Primary Examiner* — Tyler D Paige

(74) *Attorney, Agent, or Firm* — Ladas & Parry, LLP

(57) ABSTRACT

A control apparatus for a rear wheel steering system is provided to control the rear wheel steering system by calculating a target rear wheel steering angle using sensors included in a parking assist system. The control apparatus includes a first sensor and a second sensor spaced apart from each other and mounted on a rear portion of a vehicle, a determiner configured to determine whether a trailer is mounted at a rear side of the vehicle using the first sensor or the second sensor, and a controller configured to control the rear wheel steering system according to a target rear wheel steering angle calculated using the first and second sensors when it is determined that the trailer is mounted at the rear side of the vehicle.

18 Claims, 5 Drawing Sheets

CONTROL APPARATUS AND CONTROL METHOD FOR REAR WHEEL STEERING SYSTEM

CROSS-REFERENCE TO RELATED APPLICATION

This application claims priority to and the benefit of Korean Patent Application No. 2017-0095532, filed on Jul. 27, 2017, the disclosure of which is incorporated herein by reference in its entirety.

BACKGROUND

1. Field of the Invention

The present invention relates to a control apparatus and control method for a rear wheel steering system.

2. Discussion of Related Art

In the past, four-wheel steering systems based on a rear wheel steering system having a mechanical or hydraulic operation structure were developed and mass-produced, but failed to be popularized due to a sense of incongruity in steering and a low sense of ride comfort.

Active rear wheel steering (RWS) systems that have resolved problems of conventional four-wheel steering systems have been actively developed as a need for development of an electrically powered body electronic system for expansion of electronic vehicles and hybrid vehicles distribution and safety improvement has increased recently.

A four-wheel steering system including such an active rear wheel steering system is aimed to improve maneuverability of a vehicle by reducing a rotation radius of the vehicle at the time of a slow-speed turn through reverse-phase control (relative to a front wheel steering direction) of a rear wheel steering system, and improve stability of the vehicle by reducing a yaw rate and a slide slip at the time of a high-speed turn through in-phase control (relative to a front wheel steering direction). In addition, a method of determining a rear wheel steering mode using a verity of information of a vehicle and calculating and controlling a target rear wheel steering angle is applied.

Generally, when an accessory vehicle, i.e., a trailer, is connected to a vehicle equipped with an active rear wheel steering system and is operated, a method of calculating and controlling an individual target rear wheel steering angle in a trailer mode is applied in order to prevent a jack-knife phenomenon and a sway phenomenon and improve driving stability and controllability of the vehicle.

In the method of calculating and controlling the target rear wheel steering angle in a trailer mode, the trailer mode is determined using an additional device, such as a driver mode switch, for a driver to select and release the trailer mode.

In addition, the target rear wheel steering angle in the trailer mode is calculated using preset trailer parameters (trailer mass, yaw moment, and cornering stiffness) and additional sensors, such as a hitch angle sensor and a trailer yaw rate sensor.

SUMMARY

One objective of the present invention is to provide a control apparatus and control method for a rear wheel steering system which are capable of determining whether a trailer is mounted to a rear of a vehicle using sensors included in a conventional parking assist system.

Another objective of the present invention is to provide a control apparatus and control method for a rear wheel steering system which are capable of controlling the rear wheel steering system by calculating a target rear wheel steering angle using sensors included in a conventional parking assist system.

In one general aspect, there is provided a control apparatus for a rear wheel steering system, the control apparatus including a first sensor and a second sensor spaced apart from each other and mounted on a rear portion of a vehicle, a determiner configured to determine whether a trailer is mounted at a rear side of the vehicle using the first sensor or the second sensor, and a controller configured to control the rear wheel steering system according to a target rear wheel steering angle calculated using the first and second sensors when it is determined that the trailer is mounted at the rear side of the vehicle.

The control apparatus may further include a calculator configured to calculate distances (a first distance and a second distance) from a position of each of the first sensor and the second sensor to a position of the trailer in a longitudinal direction of a vehicle frame and calculate the target rear wheel steering angle such that a difference between the first distance and the second distance is less than or equal to a threshold distance value.

The control apparatus may further include a calculator configured to calculate distances (a first distance and a second distance) from a position of each of the first sensor and the second sensor to a position of the trailer in a longitudinal direction of a vehicle frame, calculate a rate (a first distance change rate or a second distance change rate) of change of the first distance per unit time or a rate of change of the second distance per unit time, and calculate the target rear wheel steering angle such that the first or second distance change rate is less than or equal to a threshold change rate value.

The threshold distance value and the threshold change rate value may be determined according to at least one of a vehicle speed, a front wheel steering angle, a front wheel steering angular velocity, a yaw rate, a lateral acceleration, and a control mode of the rear wheel steering system.

The control apparatus may further include a calculator configured to calculate distances (a first distance and a second distance) from a position of each of the first sensor and the second sensor to a position of the trailer in a longitudinal direction of a vehicle frame, calculate a width of the trailer, calculate a hitch angle using the calculated first distance, second distance, and width of the trailer, and calculate the target rear wheel steering angle such that the hitch angle becomes zero degrees.

In another general aspect, there is provided a control method of a rear wheel steering system using first and second sensors which are spaced apart from each other and mounted on a rear portion of a vehicle, the method including determining whether a trailer is mounted at a rear side of the vehicle using the first sensor or the second sensor and controlling the rear wheel steering system according to a target rear wheel steering angle calculated using the first and second sensors when it is determined that the trailer is mounted at the rear side of the vehicle.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
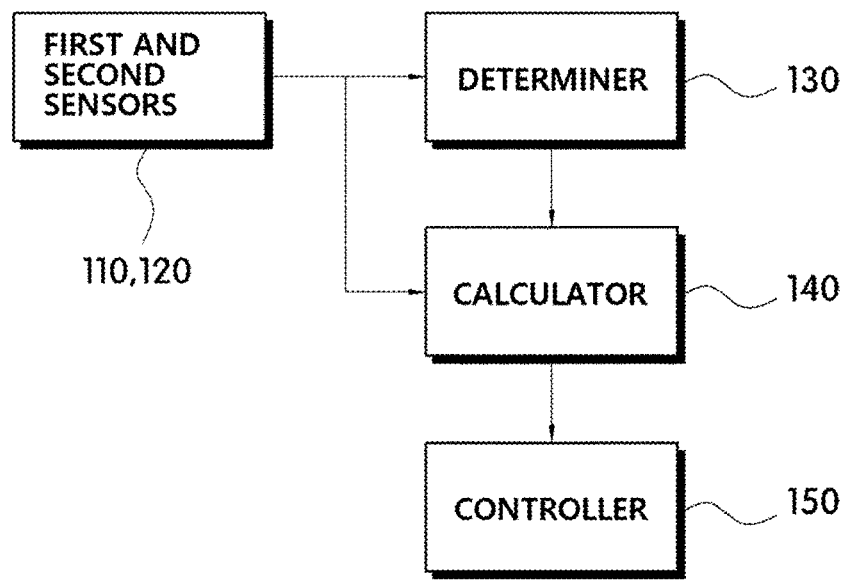
FIG. 1 is a schematic block diagram illustrating a control apparatus for a rear wheel steering system according to an embodiment of the present invention.

The present invention will be described more fully hereinafter with reference to the accompanying drawings, in which exemplary embodiments of the present invention are shown, which may be easily performed by those skilled in the art. However, the present invention may be embodied in many different forms and is not to be construed as being limited to the embodiments set forth herein. Also, irrelevant details have been omitted from the drawings for increased clarity and conciseness, and similar parts are indicated by similar reference numerals throughout the detailed description.

The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
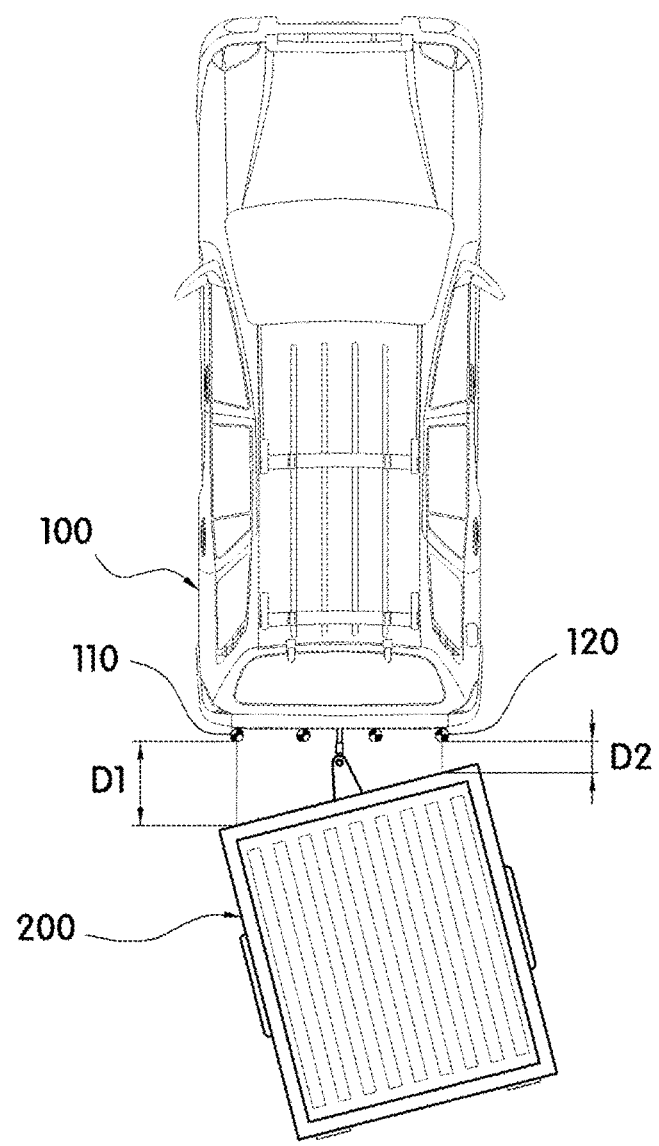
FIGS. 2 to 4 are diagrams for describing the control apparatus for a rear wheel steering system according to an embodiment of the present invention.
Figure 3:
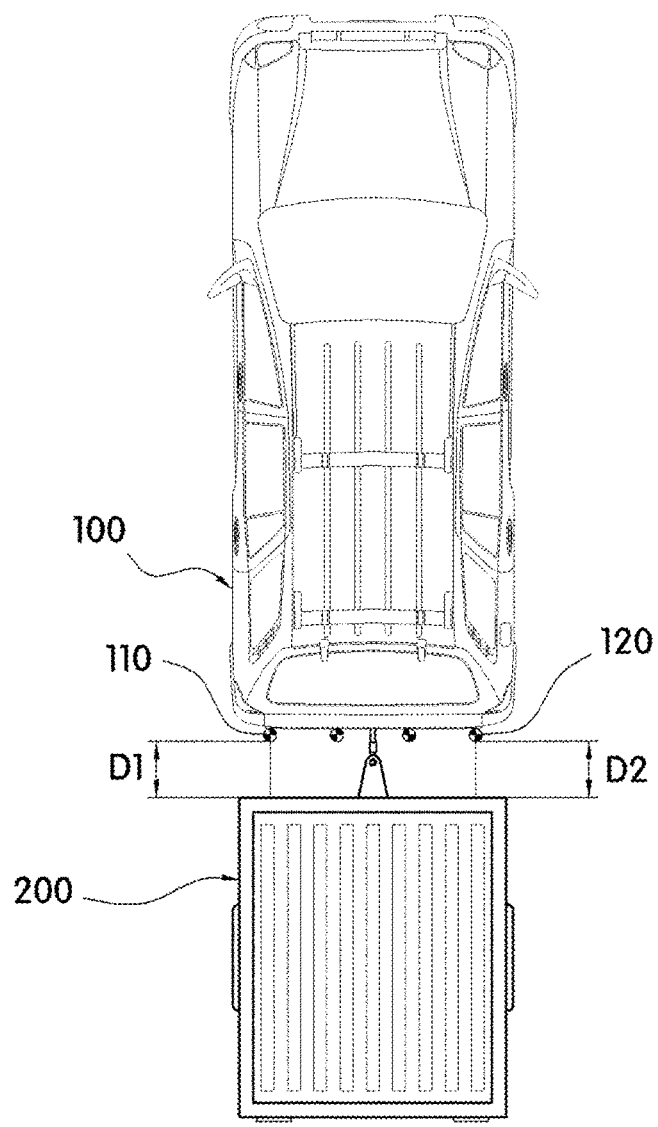
Figure 4:
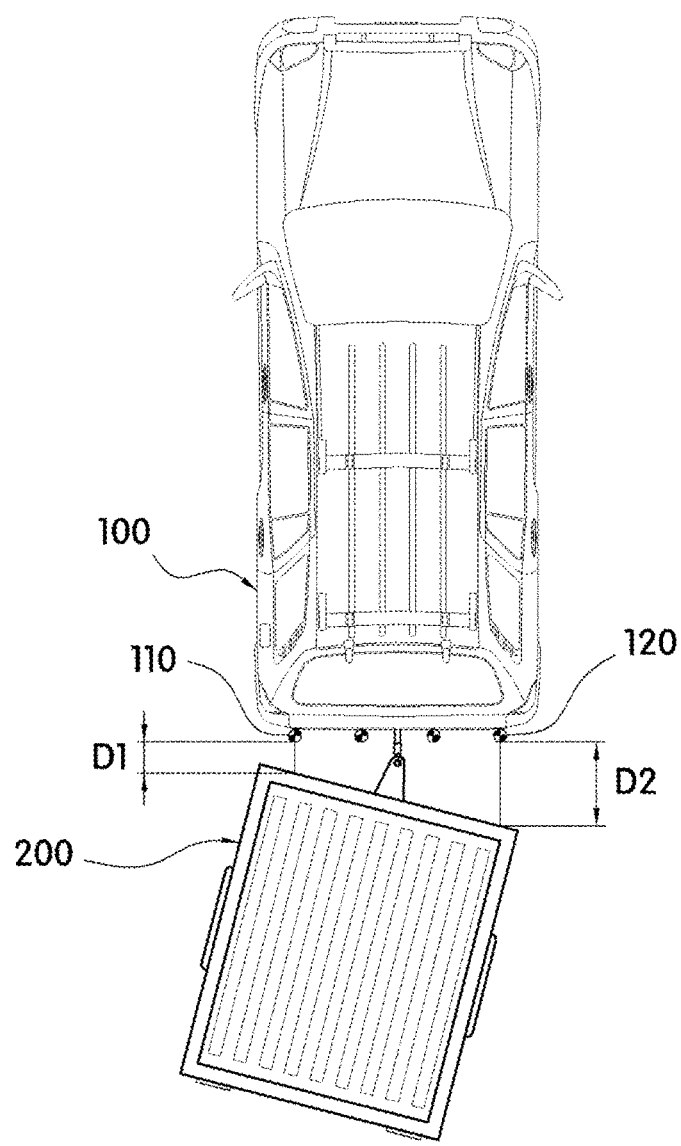

FIG. 1 is a schematic block diagram illustrating a control apparatus for a rear wheel steering system according to an embodiment of the present invention. FIGS. 2 to 4 are diagrams for describing the control apparatus for a rear wheel steering system according to an embodiment of the present invention.

As shown in FIGS. 1 to 4, the control apparatus for the rear wheel steering system according to the embodiment of the present invention may include a first sensor 110, a second sensor 120, a determiner 130, a calculator 140, and a controller 150.

The first sensor 110 and the second sensor 120 are spaced apart from each other and mounted at a rear side of a vehicle 100.

In FIGS. 2 to 4, four sensors are illustrated as being disposed at equal distances about the center of the rear side of the vehicle 100, but the embodiment is not limited thereto. At least two sensors may be used and the outermost sensors in a lateral direction from the center of the rear side of the vehicle 100 are referred to as a first sensor 110 and a second sensor 120.

The first sensor 110 and the second sensor 120 are components included in a parking assist system, and may be formed of at least one of an ultrasonic sensor, a laser sensor, lidar sensor and a camera sensor to detect an obstacle (a distance between the vehicle 100 and the obstacle, and a width of the obstacle) located behind the vehicle 100 when the vehicle 100 is parked, thereby facilitating parking.

As such, in the case in which the first sensor 110 and the second sensor 120 function as parking assistants, a visual or acoustic alarm is generated when the first sensor 110 and the second sensor 120 detect an obstacle located behind the vehicle 100. In addition, when parking is completed, the first sensor 110 and the second sensor 120 stop operating.

The determiner 130 determines whether a trailer 200 is mounted at a rear side of the vehicle 100 using the first sensor 110 and the second sensor 120.

Specifically, when the first sensor 110 and the second sensor 120 detect an obstacle of a predetermined width within a predetermined distance behind the vehicle 100, it is determined that the trailer 200 is mounted at the rear side of the vehicle 100 so that the visual or acoustic alarm is disabled and the first sensor 110 and the second sensor 120 are maintained to operate.

As described above, the control apparatus for a rear wheel steering system according to one embodiment of the present invention determines whether the trailer 200 is mounted at the rear side of the vehicle 100 using the first sensor 110 and the second sensor 120 included in the conventional parking assist system, and thus a separate switch for a driver to select or release a trailer mode is not necessary. Accordingly, it is possible to reduce cost for installing the separate switch.

Meanwhile, the determiner 130 may be included in the parking assist system or the rear wheel steering system, or may be manufactured as a separate module.

When the determiner 130 determines that the trailer 200 is mounted at the rear side of the vehicle 100, the calculator 140 and the controller 150 operate.

As shown in FIGS. 2 to 4, the calculator 140 calculates a first distance D1 between positions of the first sensor 110 and the trailer 200 in a longitudinal direction of a vehicle frame and a second distance D2 between positions of the second sensor 120 and the trailer 200 in the longitudinal direction of the vehicle frame using the first sensor 110 and the second sensor 120.

FIG. 2 illustrates a case in which the trailer 200 is slanted to the right with respect to the longitudinal direction of the vehicle frame of the vehicle 100 and the first distance D1 is greater than the second distance D2 (D1>D2). FIG. 3 illustrates a case in which the trailer 200 is aligned with the longitudinal direction of the vehicle frame of the vehicle 100 and the first distance D1 is equal to the second distance D2 (D1=D2). FIG. 4 illustrates a case in which the trailer 200 is biased to the left with respect to the longitudinal direction of the vehicle frame of the vehicle 100 and the first distance D1 is smaller than the second distance D2 (D1<D2).

In addition, the calculator 140 calculates a first target rear wheel steering angle such that an absolute value of a difference (D1−D2) between the first distance D1 and the second distance D2 is smaller than or equal to a threshold distance value. That is, the calculator 140 calculates the first target real wheel steering angle for enabling the trailer 200, which is biased to the right or left with respect to the longitudinal direction of the vehicle frame of the vehicle 100, to be aligned with the longitudinal direction of the vehicle frame of the vehicle 100.

Here, the threshold distance value is a predetermined value, which may be determined according to at least one of a vehicle speed, a front wheel steering angle, a front wheel steering angular velocity, a yaw rate, a lateral acceleration, and a control mode of the rear wheel steering system.

The control mode of the rear wheel steering system is classified into an in-phase control mode and a reverse-phase control mode. Specifically, the in-phase control mode is to control the rear wheels in the same direction as the front wheel steering direction. According to the in-phase control mode, it is possible to improve the stability of the vehicle 100 by reducing the yaw rate and side-slip when the vehicle 100 turns at high speed.

In addition, the reverse-phase control mode is to control the rear wheels in a direction different from the forward wheel steering direction. According to the reverse-phase control mode, it is possible to improve the maneuverability of the vehicle 100 by reducing a rotation radius of the vehicle 100 when the vehicle 100 turns at slow speed.

The controller 150 controls the rear wheel steering system according to the first target rear wheel steering angle calculated by the calculator 140.

The calculator 140 calculates a first distance change rate (ΔD1/Δt) which is a rate of change of the first distance D1 per unit time, and calculates a second distance change rate (ΔD2/Δt) which is a rate of change of the second distance per unit time.

In addition, the calculator 140 calculates a second target rear wheel steering angle such that the first distance change rate (ΔD1/Δt) or the second distance change rate (ΔD2/Δt) is less than or equal to a change rate threshold value. That is, the calculator 140 calculates the second target rear wheel steering angle for minimizing a degree of slant of the trailer 200 to the left or right with respect to the longitudinal direction of the vehicle frame of the vehicle 100.

The threshold change rate value is a predetermined value, which may be determined according to at least one of the vehicle speed, the front wheel steering angle, the front wheel steering angular velocity, the yaw rate, the lateral acceleration, and the control mode of the rear wheel steering system.

Meanwhile, the calculator 140 may calculate a mean distance of the first distance D1 and the second distance D2 and the width WT of the trailer 200 using the first sensor 110 and the second sensor 120. When the calculator 140 calculates the width WT of the trailer 200, it may be preferable to calculate the width when there is no difference between the first distance D1 and the second distance D2, that is, the first distance D1 is the same as the second distance D2.

In addition, the calculator 140 may calculate a hitch angle $\theta_H$ using Equation 1 below.

$$\theta_H = \mathrm{Sin}^{-1}\left(\frac{|D1 - D2|}{W_T}\right) \quad \text{[Equation 1]}$$

The hitch angle $\theta_H$ defined by the Equation 1 is a coupling angle between the vehicle 100 and the trailer 200, and it may become zero degrees when the trailer 200 is aligned with the longitudinal direction of the vehicle frame of the vehicle 100.

In addition, the calculator 140 calculates a third target rear wheel steering angle such that the hitch angle $\theta_H$ becomes zero degrees. That is, the calculator 140 calculates the third target rear wheel steering angle for enabling the trailer 200, which is biased to the left or right with respect to the longitudinal direction of the vehicle frame of the vehicle 100, to be aligned with the longitudinal direction of the vehicle frame.

As described above, the control apparatus for the rear wheel steering system according to an embodiment of the present invention controls the rear wheel steering system by calculating the target rear wheel steering angle using the first sensor 110 and the second sensor 120 included in the conventional parking assist system, and hence there is no need to install a hitch angle sensor for measuring a hitch angle $\theta_H$ and a trailer yaw rate sensor for measuring a yaw rate of the trailer 200. Accordingly, it is possible to reduce costs for installing a separate hitch angle sensor and trailer yaw rate sensor.

Meanwhile, the calculator 140 and the controller 150 may be included in the parking assist system or in the rear wheel steering system, or may be manufactured as separate modules.

Figure 5:
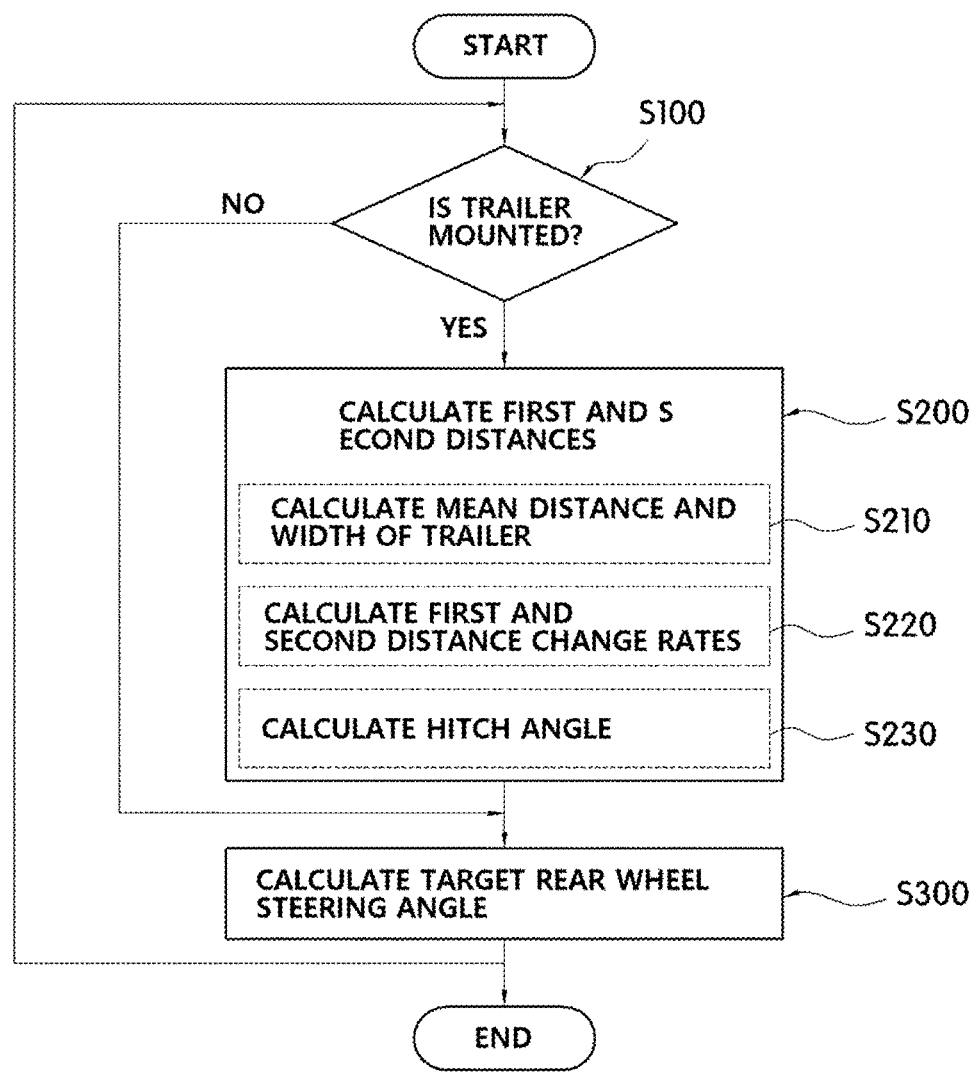
FIG. 5 is a flowchart illustrating a control method of a rear wheel steering system according to an embodiment of the present invention.

FIG. 5 is a flowchart illustrating a control method of a rear wheel steering system according to an embodiment of the present invention.

Hereinafter, the control method of a rear wheel steering system according to the embodiment of the present invention will be described with reference to FIGS. 1 to 5, but the same description as that of the rear wheel steering system according to the above-described embodiment of the present invention will be omitted.

The control method of a rear wheel steering system according to the embodiment of the present invention includes determining whether the trailer 200 is mounted at the rear side of the vehicle 100 (S100), calculating a target rear wheel steering angle (S300), and controlling the rear wheel steering system according to the target rear wheel steering angle.

Whether the trailer 200 is mounted at the rear side of the vehicle 100 is determined using the first sensor 110 and the second sensor 120 (S100).

As such, in the control method of a rear wheel steering system according to the embodiment of the present invention, since whether the trailer 200 is mounted at the rear side of the vehicle 100 is determined using the first sensor 110 and the second sensor 120 which are included in a conventional parking assist system, a separate switch for a driver to select or release a trailer mode is not necessary. Accordingly, it is possible to reduce cost for installing the separate switch.

When it is determined that the trailer 200 is mounted at the rear side of the vehicle 100, the control method may further include calculating a first distance D1 and a second distance D2 (S200), calculating a first distance change rate (ΔD1/Δt) or a second distance change rate (ΔD2/Δt) (S210), calculating a width WT of the trailer 200 (S220), and calculating a hitch angle $\theta_H$ (S230).

First, the first distance D1 between positions of the first sensor 110 and the trailer 200 in a longitudinal direction of the vehicle frame and a second distance D2 between positions of the second sensor 120 and the trailer 200 in the longitudinal direction of the vehicle frame are calculated (S200).

Then, the first distance change rate (ΔD1/Δt), which is a rate of change of the first distance D1 per unit time, is calculated and the second distance change rate (ΔD2/Δt), which is a rate of change of the second distance per unit time, is calculated (S210).

Then, a mean distance between the first distance D1 and the second distance D2 and the width WT of the trailer 200 are calculated (S220), and then the hitch angle $\theta_H$ is calculated using the Equation 1 (S230).

In the calculating of the target rear wheel steering angle (S300), a first target rear wheel steering angle is calculated such that an absolute value of a difference between the first distance D1 and the second distance D2 is less than or equal to a threshold distance value. That is, the first target real wheel steering angle for enabling the trailer 200, which is biased to the right or left with respect to the longitudinal direction of the vehicle frame of the vehicle 100, to be aligned with the longitudinal direction of the vehicle frame of the vehicle 100 is calculated.

In addition, in the calculating of the target rear wheel steering angle (S300), a second target rear wheel steering angle is calculated such that the first distance change rate (ΔD1/Δt) or the second distance change rate (ΔD2/Δt) is less than or equal to a change rate threshold value. That is, the calculator 140 calculates the second target rear wheel steering angle for minimizing a degree of bias of the trailer 200 to the left and right with respect to the longitudinal direction of the vehicle frame of the vehicle 100.

Additionally, in the calculating of the target rear wheel steering angle (S300), a third target rear wheel steering angle is calculated such that the hitch angle $\theta_H$ becomes zero degrees. That is, the third target rear wheel steering angle for enabling the trailer 200, which is biased to the left or right with respect to the longitudinal direction of the vehicle frame of the vehicle 100, to be aligned with the longitudinal direction of the vehicle frame is calculated.

Meanwhile, the determining of whether the trailer 200 is mounted (S100) and the calculating of the first distance D1 and the second distance D2 (S200) may be performed in the parking assist system, and the calculating of the first distance change rate ($\Delta D1/\Delta t$) or the second distance change rate ($\Delta D2/\Delta t$) may be performed in the parking assist system or the rear wheel steering system.

As described above, in the control method of a rear wheel steering system according to the embodiment of the present invention, since the rear wheel steering system is controlled by calculating the target rear wheel steering angle using the first sensor 110 and the second sensor 120 which are included in the conventional parking assist system, there is no need to install a hitch angle sensor for measuring a hitch angle $\theta_H$ and a trailer yaw rate sensor for measuring a yaw rate of the trailer 200. Accordingly, it is possible to reduce costs for installing the separate hitch angle sensor and trailer yaw rate sensor.

When it is determined that the trailer 200 is not mounted at the rear side of the vehicle 100, the rear wheel steering system is controlled by calculating the target rear wheel steering angle using a conventional method, and thus a detailed description thereof will be omitted.

According to the present invention, whether a trailer is mounted at a rear side of a vehicle is determined using sensors included in the conventional parking assist system, and thus a separate switch for a driver to select or release a trailer mode is not necessary. Accordingly, it is possible to reduce cost for installing the separate switch.

In addition, according to the present invention, a rear wheel steering system is controlled by calculating a target rear wheel steering angle using sensors included in the conventional parking assist system, and thus there is no need to install a hitch angle sensor and a trailer yaw rate sensor. Accordingly, it is possible to reduce cost for installing the separate hitch angle sensor and trailer yaw rate sensor.

Although the preferred embodiments of the present invention have been disclosed for illustrative purposes, those skilled in the art should appreciate that various modifications, additions, and substitutions are possible without departing from the scope and spirit of the present invention as disclosed in the accompanying claims.

REFERENCE NUMERALS

100: VEHICLE
110, 120: FIRST SENSOR, SECOND SENSOR
130: DETERMINER
140: CALCULATOR
150: CONTROLLER
200: TRAILER

What is claimed is:

1. A control apparatus for a rear wheel steering system configured to control rear wheels of a vehicle, the control apparatus comprising:
    a first sensor and a second sensor spaced apart from each other and mounted on a rear portion of the vehicle;
    a determiner configured to determine whether a trailer is mounted at a rear side of the vehicle using at least one of the first sensor or the second sensor;
    a calculator configured to calculate a first distance between the first sensor and the trailer in a longitudinal direction of the vehicle and a second distance between the second sensor and the trailer in the longitudinal direction of the vehicle and calculate a target rear wheel steering angle based on difference between the first distance and the second distance; and
    a controller configured to control the rear wheel steering system according to the target rear wheel steering angle calculated based on the difference between the first distance and the second distance when it is determined that the trailer is mounted at the rear side of the vehicle.

2. The control apparatus of claim 1, wherein the calculator is configured to calculate the target rear wheel steering angle such that the difference between the first distance and the second distance is less than or equal to a threshold distance value.

3. The control apparatus of claim 2, wherein the threshold distance value is determined according to at least one of a vehicle speed, a front wheel steering angle, a front wheel steering angular velocity, a yaw rate, a lateral acceleration, and a control mode of the rear wheel steering system.

4. The control apparatus of claim 1, wherein the calculator is configured to calculate a width of the trailer, calculate a hitch angle using the calculated first distance, second distance, and width of the trailer, and calculate the target rear wheel steering angle such that the hitch angle becomes zero degrees.

5. The control apparatus of claim 4, wherein the width of the trailer is calculated when the first distance is equal to the second distance.

6. The control apparatus of claim 1, wherein the first sensor and the second sensor are included in a parking assist system.

7. The control apparatus of claim 1, wherein each of the first sensor and the second sensor comprises at least one of an ultrasonic sensor, a laser sensor, lidar sensor and a camera sensor.

8. A control apparatus for a rear wheel steering system configured to control rear wheels of a vehicle, the control apparatus comprising:
    a first sensor and a second sensor spaced apart from each other and mounted on a rear portion of the vehicle;
    a determiner configured to determine whether a trailer is mounted at a rear side of the vehicle using at least one of the first sensor or the second sensor;
    a calculator configured to:
        calculate a first distance between the first sensor and the trailer in a longitudinal direction of the vehicle and a second distance between the second sensor and the trailer in the longitudinal direction of the vehicle,
        calculate a first distance change rate, which is a change rate of the first distance per unit time,_ or a second distance change rat; which is a change rate of the second distance per unit time, and
        calculate the target rear wheel steering angle calculated based on the first distance change rate or the second distance change rate such that the first or second distance change rate is less than or equal to a threshold change rate value; and a controller configured to control the rear wheel steering system according to the target rear wheel steering angle calculated based on the first or second distance change rate when it is determined that the trailer is mounted at the rear side of the vehicle.

9. The control apparatus of claim 8, wherein the threshold change rate value is determined according to at least one of a vehicle speed, a front wheel steering angle, a front wheel steering angular velocity, a yaw rate, a lateral acceleration, and a control mode of the rear wheel steering system.

10. A method of controlling a rear wheel steering system configured to control rear wheels of a vehicle comprising first and second sensors which are spaced apart from each other and mounted on a rear portion of the vehicle, the method comprising:

determining whether a trailer is mounted at a rear side of the vehicle using at least one of the first sensor or the second sensor;

calculating a first distance between the first sensor and the trailer in a longitudinal direction of the vehicle and a second distance between the second sensor and the trailer in the longitudinal direction of the vehicle and calculating a target rear wheel steering angle based on difference between the first distance and the second distance; and controlling the rear wheel steering system according to the target rear wheel steering angle calculated based on the difference between the first distance and the second distance when it is determined that the trailer is mounted at the rear side of the vehicle.

11. The control method of claim 10, wherein the calculating of the target rear wheel steering angle based on the difference between the first distance and the second distance comprises calculating the target rear wheel steering angle such that the difference between the first distance and the second distance is less than or equal to a threshold distance value.

12. The method of claim 11, wherein the threshold distance value is determined according to at least one of a vehicle speed, a front wheel steering angle, a front wheel steering angular velocity, a yaw rate, a lateral acceleration, and a control mode of the rear wheel steering system.

13. The method of claim 11, wherein the determining of whether the trailer is mounted and the calculating of the first distance and the second distance are performed in a parking assist system.

14. The method of claim 13, wherein the calculating of the first distance change rate or the second distance change rate is performed in the parking assist system or in the rear wheel steering system.

15. The control method of claim 10, further comprising:

calculating a first distance change rate, which is a change rate of the first distance per unit time, or a second distance change rate, which is a change rate of the second distance per unit time; and calculating the target rear wheel steering angle such that the first or second distance change rate is less than or equal to a threshold change rate value.

16. The method of claim 15, wherein the threshold change rate value is determined according to at least one of a vehicle speed, a front wheel steering angle, a front wheel steering angular velocity, a yaw rate, a lateral acceleration, and a control mode of the rear wheel steering system.

17. The method of claim 10, further comprising:

calculating a width of the trailer;

calculating a hitch angle using the calculated first distance, second distance, and width of the trailer; and calculating the target rear wheel steering angle such that the hitch angle becomes zero degrees.

18. The method of claim 17, wherein the calculating of the width of the trailer is performed when the first distance is equal to the second distance.

* * * * *